US010367863B2

(12) United States Patent
Patel et al.

(10) Patent No.: US 10,367,863 B2
(45) Date of Patent: Jul. 30, 2019

(54) METHOD FOR PROVIDING DYNAMIC QUALITY OF SERVICE FOR PUSH-TO-TALK SERVICE

(71) Applicant: Kodiak Networks Inc., Plano, TX (US)

(72) Inventors: Krishnakant M. Patel, Richardson, TX (US); Brahmananda R. Vempati, Dallas, TX (US); Harisha Mahabaleshwara Negalaguli, Richardson, TX (US); Ramu Kandula, Plano, TX (US)

(73) Assignee: KODIAK NETWORKS INC., Plano, TX (US)

( * ) Notice: Subject to any disclaimer, the term of this patent is extended or adjusted under 35 U.S.C. 154(b) by 204 days.

(21) Appl. No.: 15/585,976

(22) Filed: May 3, 2017

(65) Prior Publication Data

US 2017/0237790 A1    Aug. 17, 2017

Related U.S. Application Data

(63) Continuation of application No. PCT/US2015/058804, filed on Nov. 3, 2015.
(Continued)

(51) Int. Cl.
*H04L 29/06* (2006.01)
*H04L 12/14* (2006.01)
(Continued)

(52) U.S. Cl.
CPC ...... *H04L 65/4061* (2013.01); *H04L 12/1407* (2013.01); *H04L 65/1006* (2013.01);
(Continued)

(58) Field of Classification Search
USPC .............. 709/201–205, 225–229, 235, 233
See application file for complete search history.

(56) References Cited

U.S. PATENT DOCUMENTS 3,912,874 A    10/1975 Botterell et al.
4,796,293 A    1/1989 Blinken et al.
(Continued)

FOREIGN PATENT DOCUMENTS

GB    2338150 A    3/1998
JP    200392776 A    10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Jude Jean Gilles

(57) ABSTRACT

A system and method for providing dynamic quality-of-service (QoS) for Push-to-Talk (PTT) services in a wireless communications network. One or more servers interface to the wireless communications network to perform the PTT services for mobile units therein. Both the servers and the mobile units communicate with each other using control messages transmitted across bearers in the wireless communications network, and at least one of the servers transmits media streams comprised of voice messages for the PTT services between the mobile units across the bearers in the wireless communications network. At least one of the servers sets up a dedicated bearer in the wireless communications network for at least one of the mobile units, wherein the dedicated bearer has a specified quality of service (QoS) for transmission of at least the media streams to the mobile unit. The dedicated bearer may be static or dynamic.

27 Claims, 8 Drawing Sheets

Related U.S. Application Data

(60) Provisional application No. 62/074,386, filed on Nov. 3, 2014.

(51) Int. Cl.
*H04W 4/10* (2009.01)
*H04M 15/00* (2006.01)
*H04W 4/24* (2018.01)
*H04W 88/10* (2009.01)
*H04W 76/45* (2018.01)

(52) U.S. Cl.
CPC ............ *H04L 65/608* (2013.01); *H04L 65/80* (2013.01); *H04M 15/00* (2013.01); *H04M 15/63* (2013.01); *H04M 15/66* (2013.01); *H04M 15/8016* (2013.01); *H04W 4/10* (2013.01); *H04W 4/24* (2013.01); *H04W 76/45* (2018.02); *H04W 88/10* (2013.01)

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, iii et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,768,999 B1 * | 8/2010 | Dhanoa .............. H04L 65/4038 370/267 |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 7,941,171 B2 * | 5/2011 | Vempati .................. H04W 4/10 455/519 |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0220079 A1 * | 10/2005 | Asokan ................. H04W 76/15 370/352 |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2005/0288047 A1 | 12/2005 | Ananthanarayanan et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |

(56) References Cited

U.S. PATENT DOCUMENTS

| | | |
|---|---|---|
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1* | 3/2007 | Balachandran ......... H04W 4/10 455/518 |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2007/0259673 A1* | 11/2007 | Willars ............. H04W 52/0225 455/453 |
| 2008/0064364 A1 | 3/2008 | Patel et al. |
| 2008/0096597 A1* | 4/2008 | Vempati ................ H04W 4/10 455/518 |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0065481 A1 | 3/2011 | Patel et al. |
| 2011/0151917 A1* | 6/2011 | Mao ....................... H04W 4/10 455/519 |
| 2011/0183659 A1 | 7/2011 | Ayyasamy et al. |
| 2011/0250923 A1 | 10/2011 | Miller et al. |
| 2012/0033623 A1* | 2/2012 | Chu ....................... H04W 76/10 370/329 |
| 2013/0155875 A1 | 6/2013 | Ayyasamy et al. |
| 2013/0196706 A1 | 8/2013 | Patel et al. |
| 2013/0315164 A1* | 11/2013 | Arur ..................... H04W 76/40 370/329 |
| 2013/0337859 A1* | 12/2013 | Patel ..................... H04W 4/10 455/518 |
| 2014/0064210 A1* | 3/2014 | Anchan ................ H04W 76/40 370/329 |
| 2014/0148210 A1 | 5/2014 | Kundu et al. |
| 2014/0185470 A1* | 7/2014 | Bernath ................ H04L 65/105 370/252 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.
Skype: "Skype", Web Archive—Skype, May 22, 2004, pp. 1-2.
Trachwell: "TrackWell Software and Tetra Iceland deliver value added services to Tetra users", Trackwell.com, Oct. 2002, pp. 1-1.

* cited by examiner

METHOD FOR PROVIDING DYNAMIC QUALITY OF SERVICE FOR PUSH-TO-TALK SERVICE

CROSS-REFERENCE TO RELATED APPLICATIONS

This application is a continuation of International Patent Application No. PCT/US2015/058804, filed on Nov. 3, 2015, which claims the benefit under 35 U.S.C. Section 119(e) of the following commonly-assigned patent application: U.S. Provisional Application Ser. No. 62/074,386, filed on Nov. 3, 2014, by Krishnakant M. Patel, Ramu Kandula, Brahmananda R. Vempati, Harisha Mahabaleshwara Negalaguli, and Ramu Kandula, entitled "METHOD TO PROVIDE DYNAMIC QoS FOR PoC USING Rx INTERFACE," which applications are incorporated by reference herein.

This application is related to the following commonly-assigned patent applications: U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168; U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386; U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038; U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility Application Ser. No. 10/515,556 and P.C.T. International Application Serial Number PCT/US04/03038; U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268; U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883; U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038; U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464; U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271; P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424; U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat.

No. 7,689,238, issued Mar. 30, 2010, which application claims the benefit under 35 U.S.C. Section 119(e) of U.S. Provisional Application Ser. No. 60/705,115; U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265; U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250; U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090; U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521; U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042; U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332; U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," now U.S. Pat. No. 8,958,348, issued Feb. 17, 2015, which application claims the benefit under 35 U.S.C. Section 119(e) of U.S. Provisional Application Ser. No. 61/106,689; U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601; U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129; U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896; U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245; U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217; U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694; U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292; U.S. Provisional Application Ser. No. 61/682,524; and U.S. Provisional Application Ser. No. 61/705,748; U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," now U.S. Pat. No. 9,088,876, issued Jul. 21, 2015, which application claims the benefit under 35 U.S.C. Section 119(e) of U.S. Provisional application Ser. No. 61/593,485; U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," now U.S. Pat. No. 9,137,646, issued Sep. 15, 2015, which application claims the benefit under 35 U.S.C. Section 119(e) of U.S. Provisional Application Ser. No. 61/730,856; P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109; and U.S. Provisional Application Ser. No. 61/821,975; U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895; P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363; and U.S. Provisional Application Ser. No. 61/944,168; P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897; U.S. Utility application Ser. No. 14/639,794, filed Mar. 5, 2015, by Krishnakant M. Patel, Brahmananda R. Vempati, Ravi Ayyasamy, and Bibhudatta Biswal, entitled "PUSH-TO-TALK-OVER-CELLULAR (POC) SERVICE IN HETEROGENEOUS NETWORKS (HETNETS) AND MULTIMODE SMALL CELL ENVIRONMENTS," which application claims the benefit under 35 U.S.C. Section 119(e) of U.S. Provisional application Ser. No. 61/948,429; P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Serial Number PCT/US2014/047863; and P.C.T. International Application Serial Number PCT/US2015/45951, filed on Aug. 19, 2015, by Krishnakant M. Patel, Brahmananda R. Vempati, and Harisha Mahabaleshwara Negalaguli, entitled "RELAY-MODE AND DIRECT-MODE OPERATIONS FOR PUSH-TO-TALK-OVER-CELLULAR (PoC) USING WIFI TECHNOLOGIES," which application claims the benefit under 35 U.S.C. Section 119(e) of U.S. Provisional Application Ser. No. 62/039,272; P.C.T. International Application Serial Number PCT/US2015/56712, filed on Oct. 21, 2015, by Krishnakant M. Patel, Ramu Kandula, Brahmananda R. Vempati, Pravat Kumar Singh, and Harisha Mahabaleshwara Negalaguli, entitled "SYSTEM FOR INTER-COMMUNICATION BETWEEN LAND MOBILE RADIO AND PUSH-TO-TALK-OVER-CELLULAR SYSTEMS," which application claims the benefit under 35 U.S.C. Section 119(e) of U.S. Provisional Application Ser. No. 62/066,533; P.C.T. International Application Serial Number PCT/US2015/58088, filed on Oct. 29, 2015, by Krishnakant M. Patel, Brahmananda R. Vempati, Bibhudatta Biswal, Ravi Ayyasamy, Harisha Mahabaleshwara Negalaguli, and Ramu Kandula, entitled "METHODS TO LEVERAGE WEB REAL-TIME COMMUNICATION FOR IMPLEMENTING PUSH-TO-TALK SOLUTIONS," which application claims the benefit under 35 U.S.C. Section 119(e) of U.S. Provisional Application Ser. Nos. 62/072,135 and 62/117,575; P.C.T. International Application Serial Number PCT/US2015/058821, filed on Nov. 3, 2015, by Krishnakant M. Patel, Brahmananda R. Vempati, Harisha Mahabaleshwara Negalaguli, and Ramu Kandula, entitled "ARCHITECTURE FRAMEWORK TO REALIZE PUSH-TO-X SERVICES USING CLOUD-BASED STORAGE SERVICES," which application claims the benefit under 35 U.S.C. Section 119(e) of U.S. Provisional Application Ser. No. 62/074,391; P.C.T. International Application Serial Number PCT/US2015/058880, filed on Nov. 3, 2015, by Krishnakant M. Patel, Ramu Kandula, Brahmananda R. Vempati, Pravat Kumar Singh, and Harisha Mahabaleshwara Negalaguli, entitled "METHOD FOR MULTIPLEXING MEDIA STREAMS TO OPTIMIZE NETWORK RESOURCE USAGE FOR PUSH-TO-TALK-OVER-CELLULAR SERVICE," which application claims the benefit under 35 U.S.C. Section 119(e) of U.S. Provisional Application Ser. Nos. 62/074,472 and 62/111,409; all of which applications are incorporated by reference herein.

BACKGROUND

1. Field of the Invention

This invention relates in general to advanced voice services in wireless communications networks, and more specifically, to a system and method for providing dynamic quality-of-service (QoS) for Push-to-Talk (PTT) services.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing (IC), Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to AVS is based on packet or voice-over-IP (VoIP) technologies. This approach capitalizes on the "bursty" nature of PoC/PTT conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE (3rd Generation/4th Generation/Long Term Evolution), etc.

Nonetheless, there is a need in the art for improvements to the methods and systems for delivering the advanced voice services, such as PoC/PTT, that comply with both existing and emerging wireless standards and yet provide superior user experiences. For example, many existing implementations of PoC/PTT do not support the use of QoS settings in order to prioritize network resources. The present invention, on the other hand, satisfies the need for dynamic QoS for PTT services.

SUMMARY

To overcome the limitations in the prior art described above, and to overcome other limitations that will become apparent upon reading and understanding the present specification, the present invention discloses a system and method for providing dynamic QoS for PTT services in a wireless communications network.

One or more servers interface to the wireless communications network to perform advanced voice services for one or more mobile units therein, wherein the advanced voice services include an instant two-way half-duplex voice call within a group of the mobile units comprising a PTT call session. Both the servers and the mobile units that use the advanced group services communicate with each other using control messages transmitted across bearers in the wireless communications network, and at least one of the servers transmits media streams comprised of voice messages for the advanced group services between the mobile units across the bearers in the wireless communications network. One of the servers manages the PTT call sessions by acting as an arbitrator for the PTT call session and by controlling the sending of the control messages and the media streams for the PTT call session.

At least one of the servers sets up a dedicated bearer in the wireless communications network for at least one of the mobile units, wherein the dedicated bearer has a specified quality of service (QoS) for transmission of at least the media streams to the mobile unit. The dedicated bearer may be a static dedicated bearer that is subscription-based and is established on a default bearer for the mobile unit. Alternatively, the dedicated bearer may be a dynamic dedicated bearer, wherein the dynamic dedicated bearer is a pre-established dynamic dedicated bearer that is setup prior to the PTT call session or the dynamic dedicated bearer is setup when the PTT call session is setup. In the latter situation, the dynamic dedicated bearer may be setup in parallel with the setup of the PTT call session, wherein the PTT call session is setup on a default bearer, and the media streams are transmitted on the default bearer until the dynamic dedicated bearer is setup. In either situation, the dynamic dedicated bearer is torn down when the PTT call session is ended.

BRIEF DESCRIPTION OF THE DRAWINGS

Referring now to the drawings in which like reference numbers represent corresponding parts throughout.

DETAILED DESCRIPTION OF ILLUSTRATIVE EMBODIMENTS

Figure 1:
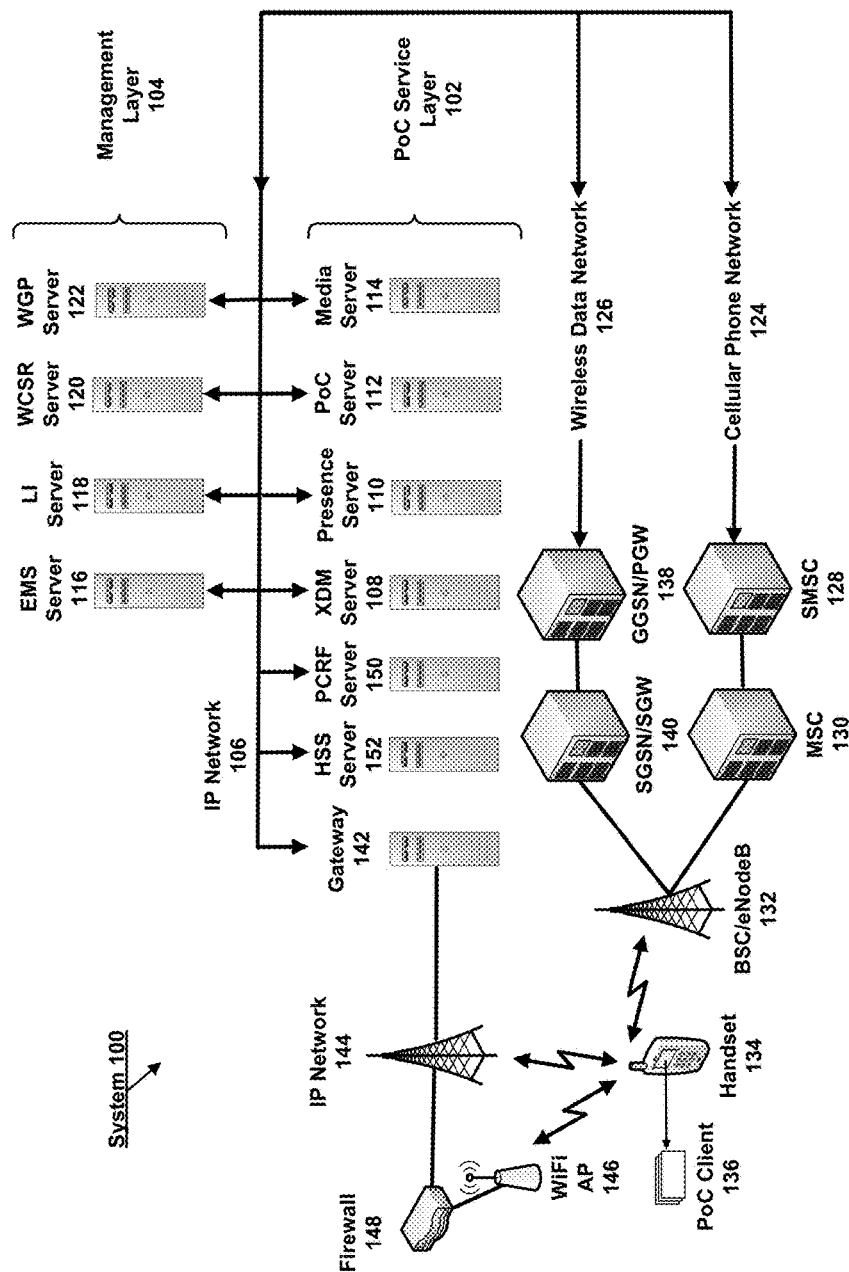
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| APN | Access Point Name |
| ARP | Allocation and Retention Priority |
| ATCA | Advanced Telecommunications Computing Architecture |
| DnD | Do not Disturb |
| DNS | Domain Name Server |
| DTLS | Datagram Transport Layer Security |
| eMBMS/MBMS | Multimedia Broadcast Multicast Services |
| EPC | Evolved Packet Core |
| EPS | Evolved Packet System |
| GBR | Guaranteed Bit Rate |
| GPRS | General Packet Radio Service |
| GSM | Global System for Mobile communications |
| HTTP | Hypertext Transport Protocol |
| HTTPS | Secure Hypertext Transport Protocol |

| Acronym | Description |
| --- | --- |
| IMSI | International Mobile Subscriber Identity |
| IP | Internet Protocol |
| IPA | Instant Personal Alert |
| MBCP | Media Burst Control Protocol |
| MBR | Maximum Bit Rate |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PDN | Packet Data Network |
| PGW | PDN GateWay |
| PoC | Push-to-talk-over-Cellular |
| PTT | Push-To-Talk |
| QoS | Quality of Service |
| QCI | QoS Class of Identifier |
| RTCP | Realtime Transport Control Protocol |
| RTP | Realtime Transport Protocol |
| SDP | Session Description Protocol |
| SGW | Serving GateWay |
| SIM | Subscriber Identity Module |
| SIP | Session Initiation Protocol |
| SMMP | Short Message peer-to-peer Protocol |
| SMS | Small Message Service |
| SRTP | Secure Real-time Transport Protocol |
| SSID | Service Set Identifier |
| SSL | Secure Sockets Layer protocol |
| SSRC | Synchronization SouRCe |
| TFT | Traffic Flow Template |
| TLS | Transport layer security protocol |
| UDP | User Datagram Protocol |
| UE | User Equipment |
| URI | Uniform Resource Identifier |
| eUTRAN | Evolved Universal Terrestrial Access Network |
| VoIP | Voice-over-IP |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Allocation and Retention Priority | Allocation and Retention Priority (ARP) is used for deciding whether new bearer modifications or establishment requests should be accepted considering the current resource situation |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Evolved Packet Core | Evolved Packet Core (EPC) is a framework for providing converged voice and data on a 4G/LTE network. |
| Evolved Packet System | Evolved Packet System (EPS) is a complete end-to-end system, that is UE, eUTRAN and EPC. |
| eUTRAN— | An LTE radio access network (RAN). |
| Firewall | A device that acts as a barrier to prevent unauthorized or unwanted communications between computer networks and external devices. |
| Guaranteed Bit Rate | Guaranteed Bit Rate (GBR) is the minimum bit rate per EPS bearer. The GBR is specified independently for uplink and downlink. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Maximum Bit Rate | Maximum Bit Rate (MBR) is the maximum bit rate per EPS bearer. The MBR is specified independently for uplink and downlink. |
| Notification | A message sent from the Presence Service to a subscribed watcher when there is a change in the Presence Information of some presentity of interest, as recorded in one or more Subscriptions. |

-continued

| Term | Description |
| --- | --- |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Quality of Service Class of Identifier | Quality of Service (QoS) Class of Identifier (QCI) is a mechanism used in LTE networks to ensure bearer traffic is allocated an appropriate QoS. Different bearer traffic requires different QoS, and therefore different QCI values, with 9 different QCI values currently specified. |
| Serving Server | A set of primary and secondary servers. |
| Subscription | The information kept by the Presence Service about a subscribed watcher's request to be notified of changes in the Presence Information of one or more Presentities. |
| Traffic Flow Template | Traffic Flow Template (TFT) is a set of information structures that is used to map service data flows to a specific bearer. A TFT is always associated with a dedicated bearer, while default bearers may or may not have a TFT. A dedicated bearer provides QoS to a special service or application and TFT defines rules so that UE and network knows which IP packets should be sent on particular dedicated bearer. It usually has rules on the basis of IP packet destination/source or protocol used. |
| Watcher | Any uniquely identifiable entity that requests Presence Information about a Presentity from the Presence Service. |
| WiFi | A wireless local area network (WLAN). |
| 4G/LTE | Fourth Generation/Long Term Evolution (4G/LTE) is a standard for wireless communication of high-speed data for mobile phones and data terminals. |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired device. The wireless data network 126, depending on its type, e.g., GPRS or 4G/LTE, includes one or more Gateway GPRS Support Nodes (GGSNs) or Packet Gateways (PGWs) 138 and Serving GPRS Support Nodes (SGSNs) or Serving GateWays (SGWs) 140, which also communicate with customer handsets 134 via BSCs or eNodeBs 132.

In one embodiment of the present invention, the PoC Service Layer 102 and Management Layer 104 are connected to one or more Gateways 142, which are coupled to one or more external IP networks 144, in order to communicate with one or more PoC Clients 136 on one or more handsets 134. Traffic to and from the wireless data networks 126 may also traverse Gateways 142.

In one embodiment of the present invention, the handsets 134 may be WiFi-enabled and thus capable of communicating with local IP networks 144, which may be comprised of one or more WiFi Access Points (APs) 146, as well as other network 144 appliances such as Firewalls 148.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:
 The GGSN/PGW 138 transfers IP packets between the PoC Client 136 and the various servers:
  SIP/IP signaling messages between the PoC Server 112 and PoC Client 136 for control traffic exchange (i.e., control packets) for call sessions.
  RTP/IP, RTCP/IP and MBCP/IP packets between the Media Server 114 and PoC Client 136 for bearer traffic exchange (i.e., voice packets) for call sessions.
  SIP/IP signaling messages between the Presence Server no and PoC Client 136 for presence information.
  XCAP/HTTP/IP and SIP/IP signaling between the XDM Server 108 and PoC Client 136 for document management.
 The SMSC 128 handles authentication:
  The XDM Server 108 communicates with the SMSC 128 via SMPP/IP for receiving the authentication code required for PoC Client 136 activation from the handset 134.

2.3 IP Network

The PoC Service Layer 102 also interacts with the following entities on the IP network 144:
 The Gateway 142 transfers IP packets between the PoC Client 136 and the various servers:
  SIP/IP signaling messages between the PoC Server 112 and PoC Client 136 for control traffic exchange (i.e., control packets) for call sessions.
  RTP/IP, RTCP/IP and MBCP/IP packets between the Media Server 114 and PoC Client 136 for bearer traffic exchange (i.e., voice packets) for call sessions.
  SIP/IP signaling messages between the Presence Server no and PoC Client 136 for presence information.
  XCAP/HTTP/IP and SIP/IP signaling between the XDM Server 108 and PoC Client 136 for document management.
  SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
 PoC Server 112,
 Media Server 114,
 Presence Server 110,
 XDM Server 108, and
 Gateway 142.
These elements are described in more detail below.

2.4.1 PoC Server

The PoC Server 112 handles the PoC/PTT call session management and is the core for managing the PoC/PTT services for the PoC Clients 136 using SIP protocol. The PoC Server 112 implements a Control Plane portion of Controlling and Participating PoC Functions. A Controlling PoC Function acts as an arbitrator for a call session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during call sessions.

2.4.3 Presence Server

The Presence Server no implements a presence enabler for the PoC service. The Presence Server no accepts, stores and distributes Presence Information for Presentities, such as PoC Clients 136.

The Presence Server no also implements a Resource List Server (RLS), which accepts and manages subscriptions to Presence Lists. Presence Lists enable a "watcher" application to subscribe to the Presence Information of multiple Presentities using a single subscription transaction.

The Presence Server no uses certain XDM functions to provide these functions, which are provided by XDM Server 108.

2.4.4 XDM Server

The XDM Server 108 implements an XDM enabler for the PoC service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway

The Gateway 142 implements an interworking solution for the PoC service to communicate via one or more IP network 144 to the PoC Clients 136. Specifically, the Gateway 142 provides PoC service over an IP network 144 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 144. The Gateway 142 also resolves security concerns that arise with such interworking solutions.

This is necessary because the quality, performance and availability of the wireless data networks 126 typically vary from location to location based on various factors. In addressing these issues, the interworking solution implemented by the Gateway 142 provides following benefits:

PoC services becomes available even in those locations where a wireless data network 126 is not available, but where a general purpose IP network 144 is available. This is particularly more useful in enhancing in-building coverage for the PoC service.

By connecting over the IP network 144, the available IP bandwidth, quality and performance can be more streamlined and controlled since the IP network 144 (typically) has a greater capacity and throughput as compared to the wireless data network 126, which is more shared in nature.

By utilizing the greater available bandwidth over the IP network 144, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:
Element Management System (EMS) Server 116,
Lawful Intercept (LI) Server 118,
Web Group Provisioning (WGP) Server 122, and
Web Customer Service Representative (WCSR) Server 120.
These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.
Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC/PTT call sessions, including 1-1, Ad Hoc and Pre-Arranged PoC/PTT call sessions. The PoC Server 112 also controls Instant Personal Alerts.

The PoC Server 112 expects the PoC Clients 136 to setup "pre-established sessions" at the time of start up and use these sessions to make outgoing calls. The PoC Server 112 also uses pre-established sessions to terminate incoming calls to the PoC Clients 136. The PoC Clients 136 are setup in auto-answer mode by default. The use of pre-established sessions and auto-answer mode together allow for faster call setup for call sessions.

The PoC Server 112 allocates and manages the media ports of the Media Servers 114 associated with each SIP INVITE dialog for pre-established sessions and controls the Media Servers 114 to dynamically associate these ports at run time for sending RTP packets during call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC/PTT settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.3 Presence Server

The Presence Server no accepts presence information published by PoC Clients 136, as well as availability information received from other entities. The Presence Server no keeps track of these presence states and sends notifications to various "watcher" applications whenever a presence state changes. The Presence Server no maintains separate subscriptions for each watcher and dynamically applies the presence authorization rules for each watcher independently.

The Presence Server no also accepts resource list subscriptions from the watchers, which identify one or more entities ("Presentities") whose presence should be monitored. The Presence Server no then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.5 Gateway

The Gateway 142 performs interworking for the PoC service by communicating with the PoC Clients 136 via one or more IP networks 144 and/or wireless data networks 126.

The PoC Client 136 sets up one or more connections using the configured Fully Qualified Domain Name (FQDN), or absolute domain name, of the Gateway 142, which may be publicly exposed to the Internet 142. Secure transport protocols may (or may not) be used for the connections across the IP networks 144 and/or wireless data networks 126. For example, the PoC Clients 136 may use the Transport Layer Security (TLS) and/or Secure Sockets Layer (SSL) protocols for encrypting information transmitted over the connections between the PoC Client 136 and the Gateway 142.

In such an embodiment, all SIP signaling and voice data (RTP and RTCP) would be tunneled over the SSL/TLS connections between the PoC Client 136 and the Gateway 142. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the Gateway 142 may perform as an encryption/decryption off-loader that provides end-to-end encryption for all traffic transmitted to and from the PoC Client 136. Specifically, all of the traffic sent to the PoC Client 136 may be encrypted at the Gateway 142 and all the traffic received from the PoC Client 136 may be decrypted at the Gateway 142.

The Gateway 142 terminates the SSL/TLS connections and aggregates or dis-aggregates the PoC Client 136 traffic to the appropriate Servers 108, 110, 112, 114, 116, 118, 120 and 122. Specifically, the Gateway 142 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the Gateway 142 is a single point-of-contact for all traffic to and from the PoC Clients 136 at an IP transport layer via the IP networks 144 and/or wireless data networks 126.

Typically, the SSL/TLS connections are persisted and used for any bidirectional data transfer between the Gateway 142, or other Servers, and the PoC Clients 136. Thus, a PoC Client 136 maintains an "always-on" connection with the Gateway 142 by periodically sending "keep-alive" messages over the SSL/TLS connections.

The system also simplifies the use of the WiFi APs 146 and Firewalls 148 or other network appliances.

3.2 Management Layer

3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

Group management,
Contact management, and
Associations between corporations.

With regard to group management, the CAT of the WGP Server 122 includes the following operations:

Create, Update, Delete and View Corporate Groups,
Add, Update, Delete and View Members of a Corporate Group,
Manage Subscribers,
Activate and Deactivate a Corporate Subscriber,
Change a Subscriber type from "Corporate" to "Corporate And Public", and vice versa,
Restrict Availability, i.e., do not allow subscriber to change their presence status, and
Manage number porting or name change via phone assignment.

With regard to contact management, the CAT of the WGP Server 122 includes the following operations:

Phone list management,
N×N Contact Add (e.g., N contacts may be members of N groups),
Add, Update, Delete and View Contacts for a specific subscriber, and
Export and Import contacts at both the subscriber and corporate level.

With regard to associations between corporations, the CAT of the WGP Server 122 includes the following operations:

Corporate Associations Attributes,
Association Name,
Association ID,
Association Mode (e.g., One-way, Two-way), and
Restricted List.

Once the association is created and accepted, corporate administrators can create contacts and groups using the association policies. Administrators from other corporations can view the contacts, and may or may not have the capability to add, update or delete the contacts.

Corporate ID associated per corporate subscriber,
Central management of corporate subscribers, groups, and contacts,
Intercorporate associations, including contacts and whitelists,
Phone list management (e.g., N×N contact add),
Restrict Availability, and
Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

PoC/PTT Calls and Instant Personal Alert,
Presence, and
Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server no as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC/PTT calls. To support PoC/PTT calls, the client module creates and maintains pre-established sessions with the PoC Server 112. The client module supports 1-1, Ad Hoc and Pre-Arranged PoC/PTT calls. The client module also supports sending and receiving Instant Personal Alerts (IPA).

4 State Diagram For A PTT Call Session

Figure 2:
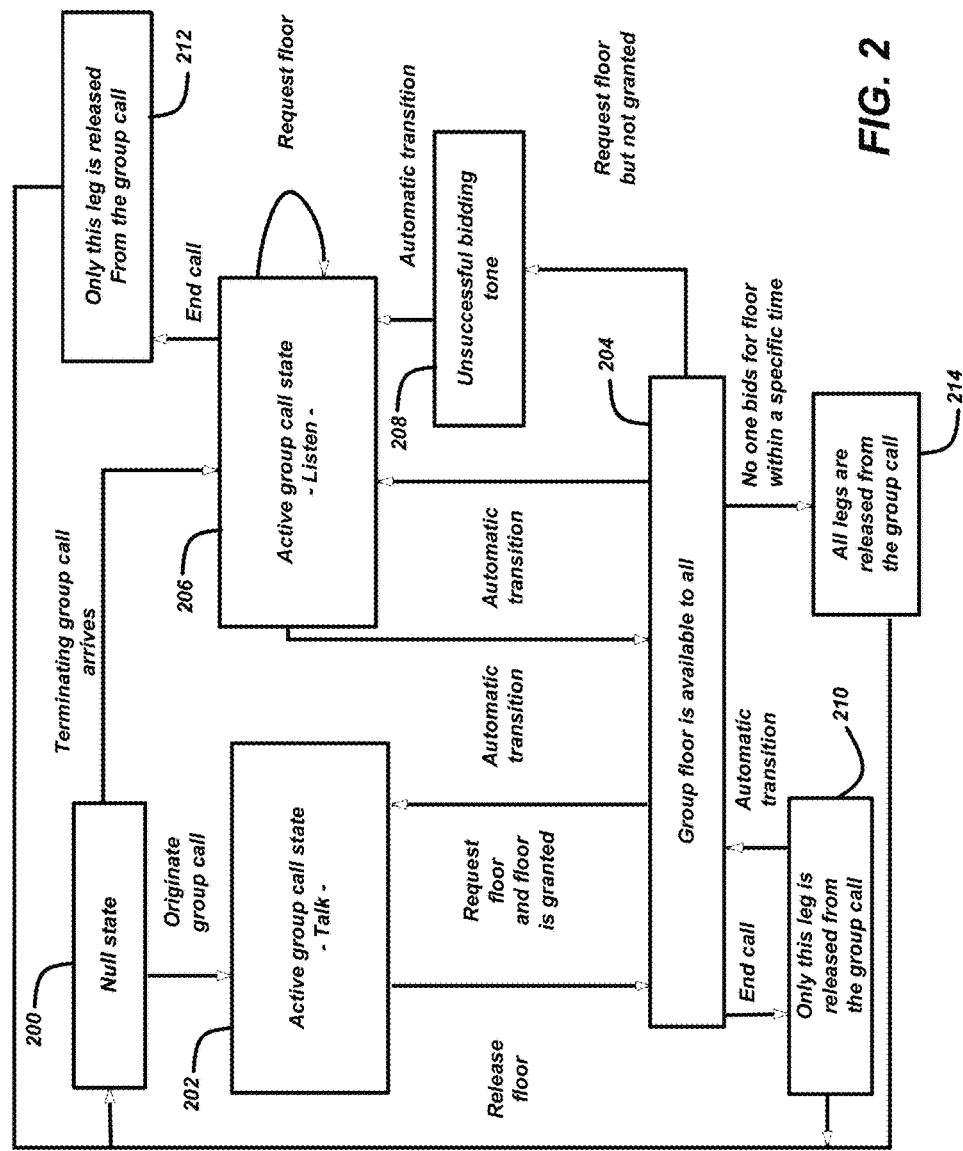
FIG. 2 is a state diagram that illustrates the operation of a PoC session according to one embodiment of the present invention.

FIG. 2 is a state diagram that illustrates the operation of a PTT call session according to one embodiment of the present invention.

State 200 represents a PoC Client 136 in a NULL state, i.e., the start of the logic. A transition out of this state is triggered by a user making a request to originate a PTT call, or by a request being made to terminate a PTT call at the handset 134. A request to originate a PTT call is normally made by pressing a PTT button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PTT call.

State 204 represents the group "floor" being available to all members of the group. When the talking user signals that the floor is released, the floor is available to all group members. The signal to release the floor is normally made by releasing the PTT button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PTT button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PTT button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Dynamic QoS Support for PTT Services

5.1 Introduction

This invention describes a method and apparatus for providing dynamic QoS over a network for PTT services. The invention includes methods utilized to establish dedicated bearers statically or dynamically, without incurring any additional delay during PTT call setup time. Various criteria can be applied based on policies defined per corporation, per subscribers, or per any dynamic conditions, such as load conditions. Policies may be derived based on the priority of the PTT call, that can be determined based on a static configuration, or that can be decided based on dynamic conditions.

5.1.1 IMS Components

Figure 3:
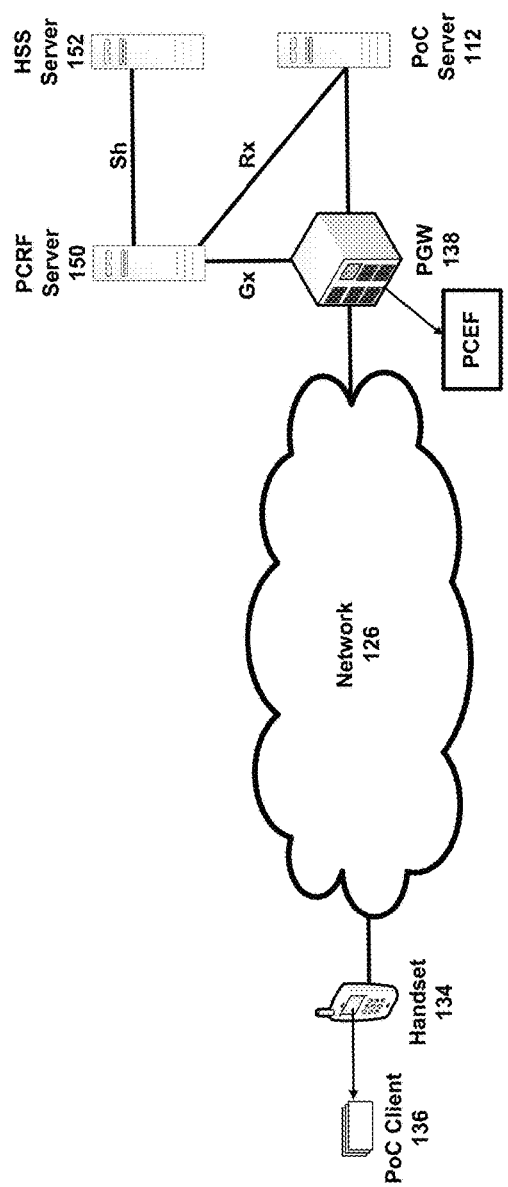
FIG. 3 is a diagram depicts the components and connectivity between components necessary for implementing QoS usage in the PoC system 100, according to one embodiment of the present invention.

FIG. 3 is a diagram depicts the components and connectivity between components necessary for implementing QoS usage in the PoC system 100 according to one embodiment of the present invention. In this embodiment, the PoC system 100 implements the IP Multimedia Subsystem (IMS) standard developed by the Third Generation Partnership Project (3GPP), and the wireless data network 126 is an EPC/LTE access network.

The PoC Server 112 performs the role of an Application Function (AF) according to the IMS standard, and a Policy Charging and Rules Function (PCRF) defined by the IMS standard is implemented in a PCRF Server 150, which is also shown in FIG. 1, although the PCRF could be implemented in another server in the system 100. The PoC Server 112 and the PCRF Server 150 communicate via an Rx interface, which is also defined under the IMS standard.

The PCRF Server 150 provides policy control decision and flow based charging control functionalities. For example, the PCRF Server 150 provides network control regarding service data flow detection, gating, QoS, and flow based charging to a Policy Control Enforcement Function (PCEF) defined by the IMS standard and implemented in the PGW 138, although the PCEF could be implemented in another server in the system 100.

The PoC Server 112 uses the Rx interface to communicate with the PCRF Server 150 during call initiation and re-negotiation to ensure that a call conforms to policy. The PoC Server 112 also uses the Rx interface during registration to learn access network 126 information.

Specifically, the PCRF Server 150 performs the following functions for the PoC Server 112 via the Rx interface:
    Confirms that call media requests conform to the appropriate policy.
    Opens gates or pinholes in the media route, and specifies the appropriate QoS.
    Requests per-flow charging information when needed.
    Informs the PoC Server 112 of media-plane events.

The PCEF implemented by the PGW 138 provides service data flow detection, user plane traffic handling, triggering control plane session management, QoS handling, service data flow measurement, as well as online and offline charging interactions. The PCEF enforces the policy control as indicated by the PCRF Server 150, e.g., the PCRF Server 150 determines how a certain data flow is treated in the PCEF and ensures that the enforcement function traffic mapping and treatment is in accordance with a user's subscription profile. The PCRF Server 150 delivers rules concerning traffic classification, QoS, and charging to the PCEF in the PGW 138 via a Gx interface.

The PoC system 100 also includes a Home Subscriber Server (HSS) function, which is implemented in an HSS Server 152, which is also shown in FIG. 1, although the HSS function could be implemented in another server in the system 100. The HSS Server 152 comprises a subscription profile repository storing records for each subscriber, wherein the PCRF Server 150 communicates with the HSS Server 152 via an Sh interface. Each subscriber record includes a subscription profile, authentication vectors, and other information for the subscriber.

5.2 Architecture 5.2.1. Architecture Overview

In the context of PTT service, there are premium subscribers who want to have better user experience on their UE device, e.g., the handset 134, as compared to regular PTT users. Also, the ability to provide preferential treatment for PIT traffic over other regular internal traffic, such as Internet browsing or file downloads, can be critical to real-time voice services, such as PTT, Voice-over-LTE (VoLTE), etc. To be able to fulfill this, QoS plays a key role, in that QoS defines priorities for certain customers and/or services during the time of high congestion in the network 126.

In an EPC/LTE access network 126, QoS is implemented between the handset 134 and the PGW 138, and is applied to a set of bearers. In this context, "bearer" is basically a virtual concept and is a set of network configurations to provide special treatment to set of traffic, e.g., PTT traffic is prioritized by the network 126 as compared to other traffic.

A bearer is a mechanism that enables the network 126 to discriminate both in quality and charging for different applications. When a handset 134 attaches to the network 126 for the first time, it is assigned a "default bearer," which remains as long as the handset 134 is attached. Devices can have more than one default bearer, but each default bearer has a separate, unique IP address. The default bearer does not provide a GBR, and typically, non-GBR QCI values can be specified.

A dedicated bearer is essentially a dedicated tunnel for one or more specific applications (e.g., PTT, VoIP, video, gaming, etc.). A dedicated bearer does not require a separate IP address, and uses the IP address associated with the previously-established default bearer. A Traffic Flow Template (TFT) is used to specify QoS settings for a specific traffic application carried on a dedicated bearer, which can be GBR or non-GBR depending on the QCI value chosen to support a specific use case.

5.2.2. QoS support for the PoC Service

In this invention, QoS support for the PTT services can be provided by one of the following mechanisms:
  (a) Network-Based Static Default QoS Bearers: QoS parameters in the network 126 are set up for any PTT traffic between the PoC Client 136 and the PoC Server 112 that requires QoS treatment based on the pre-defined IP addresses of the PoC Server 112 and Media Server 114, and the IP address range of the handset 134 in the network 126.

Static QoS bearers are "nailed-up" connections, which are subscription-based and which are established when the handsets 134 for the subscribers are powered on and the PoC Client 136 is logged into the PoC system 100, wherein the connections stay on until the devices 134 are turned off. Here, the signaling path and media path are established on the default bearer by way of a static QoS configuration in the PCRF Server 150.

With this method, all the IP traffic between the PoC Client 136 and the PoC Server 112 receives the QoS treatment on the default bearer. However, this method does not allow for detection of situations where default QoS bearers cannot be established by the network 126, for example, because of network 126 congestion. There are several other downsides from an EPC/LTE perspective as well, as the network 126 cannot use intelligent admission control strategies to predict and admit users.

(b) Pre-Established Dynamic Dedicated QoS Bearer: The PoC Server 112 dynamically establishes one or more dedicated QoS bearers when the PoC Client 136 performs a login to the PoC system 100. This implies that the PoC Server 112 pre-establishes a dedicated QoS bearer in advance by providing the TFT information containing the IP addresses and port numbers of the PoC Server 112, Media Server 114 and handset 134 to the PCRF Server 150 using the Rx interface. This approach avoids the need to configure static QoS bearers in the network 126, but results in dedicated QoS bearers being used when there is no active PoC call in progress.

(c) Dynamic Dedicated QoS Bearer at Call Setup: In this case, the dedicated QoS bearers are established only when needed at PTT call setup. However, if the PTT call setup is delayed until the setup of the dynamic dedicated QoS bearer is completed, using the Rx interface would mean an addition delay (about 200-450 ms) for the PTT call setup. Dynamically establishing the dedicated QoS bearer requires communicating among various network 126 elements, which, in turn, increases the delay until the handset 134 is connected to the network 126.

This invention describes methods and systems to overcome the various limitations described above. This invention particularly focuses on providing QoS service dynamically using the Rx interface, without compromising any key service parameters such as PTT call setup time.

5.2.3. Use of the Rx Interface to Manage Dynamic Dedicated QoS Bearers

To establish dedicated QoS bearers dynamically at the time of the PTT call setup, the PoC Server 112 communicates with the PCRF Server 150 via the Rx interface to manage the QoS and authorize the usage of specific bearer services in relation to the PTT call. The Rx interface is used for the service-based policy set-up information exchange between the PCRF Server and the PoC Server 112.

5.2.4. Establishing Dedicated QoS Bearers Dynamically at the Time of the Call

As described previously, the PTT service uses a combination of SIP and RTCP messages for call signaling, and RTP for media. There are two possible deployment options to carry SIP traffic:
  Deployment Model A: SIP traffic is carried over default QoS bearers.

Deployment Model B: SIP traffic is carried over dedicated QoS bearers (set up as either static or dynamic dedicated QoS bearers).

Preferably, the RTP and RTCP traffic are carried over dynamic dedicated QoS bearers with the required QoS. However, in order to preserve the PTT call setup time, the dynamic dedicated QoS bearers are established in parallel while PTT call setup is in progress over the default bearer. That means the RTCP and RTP packets are carried over the default bearer until the dynamic dedicated QoS bearers are established dynamically.

Figure 4:
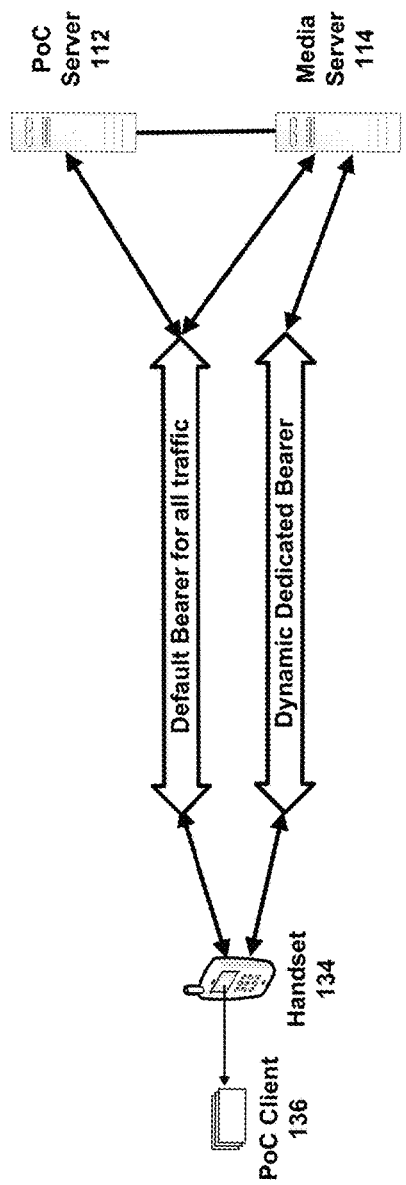
FIG. 4 illustrates Deployment Model A, wherein SIP traffic is carried over a default bearer path, according to one embodiment of the present invention.
Figure 5:
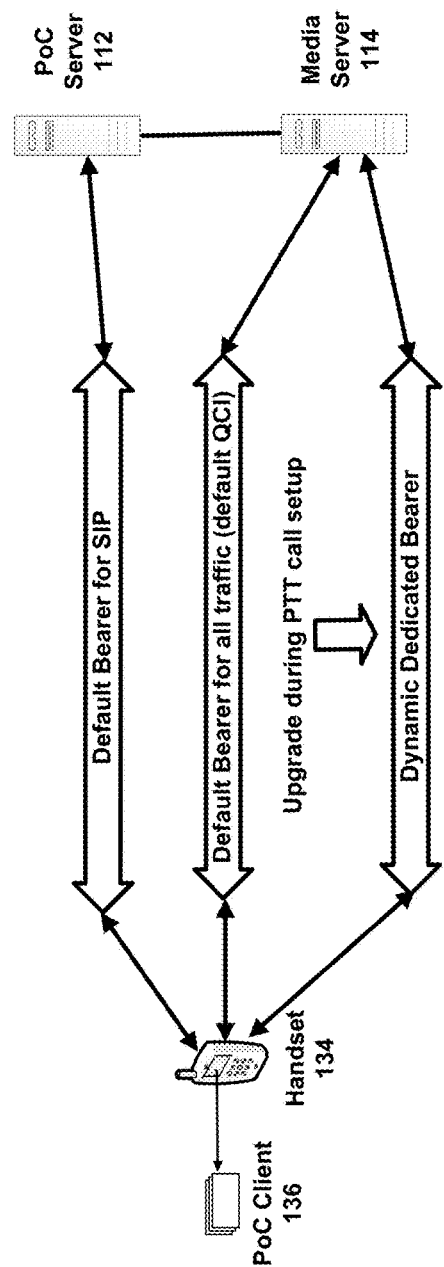
FIG. 5 illustrates Deployment Model B, wherein SIP traffic is carried over a dedicated bearer path, according to one embodiment of the present invention.

This mechanism as shown in FIGS. 4 and 5. FIG. 4 illustrates Deployment Model A, wherein the SIP traffic is carried over the default bearer, and FIG. 5 illustrates Deployment Model B, wherein the SIP traffic is carried over the dynamic dedicated QoS bearer.

The use of various bearers for the PoC services is described below:

SIP traffic is carried over either the default bearer or the dedicated QoS bearer as described previously. The dedicated bearer for SIP can be a static dedicated QoS bearer or can be a dynamic QoS bearer established dynamically at the time of the PoC Client 136 login.

The PoC Client 136 may setup a PTT Pre-Established Session at the time of the login. In that case, the PoC Client 136 establishes a SIP INVITE session with the PoC Server 112 and keeps it ready for use. Typically, the TFTs used for SIP are configured with QCI5 for IMS signaling, but the QCI can be any appropriate QoS level as determined by the network operator.

The PTT call setup involves signaling over SIP and RTCP (MBCP), wherein the SIP signaling is performed over a static SIP bearer (e.g. SIP REFER).

The dynamic dedicated QoS bearers for RTP and RTCP are established at the time of the PoC call setup, and are torn down when the PTT call ends, using the Rx interface.

RTP and/or RTCP traffic are carried over the default bearer until the TFTs used for RTP and RTCP are upgraded to a dynamic dedicated QoS bearer with better QoS (e.g. QCI7). The dynamic dedicated QoS bearers are established using the Rx interface for RTP/RTCP while the PTT call setup is in progress. This is to avoid any possible delay involved in the end-to-end setup of the dynamic dedicated QoS bearer. By allowing RTP and RTCP traffic over the default bearers during the setup of the dynamic dedicated QoS bearer, media and MBCP messages are delivered to the terminating and originating PoC Clients 136 on a best-efforts basis.

Once the bearer upgrade from default bearer to dynamic dedicated QoS bearer is complete, the RTP and RTCP traffic flows through the upgraded dynamic dedicated QoS bearer with the expected QoS.

The dynamic dedicated QoS bearers are torn down when the PTT call ends.

The PTT call ends, as noted above, when a floor idle timeout occurs or when all participants drop out of the PTT call.

5.2.5 Dynamic QoS Based User Roles and Call Types

The PoC service can support multiple levels of priority, in which the priority of the dynamic dedicated bearers depends on user roles and types of calls. For example, dedicated bearers may only be used for dispatch group calls and dispatcher calls, but not for calls between fleet members. In another example, when a PoC call is setup with emergency priority, then dedicated bearers used for this call could have the highest priority and would pre-empt any other calls or data sessions in progress, and the dedicated bearers used for the emergency call itself could not be pre-empted by other types of data sessions or calls. Still another example is that a broadcast call may have a higher priority than normal PoC calls, and hence may pre-empt such PoC calls.

This can be achieved by using the capabilities of a Policy and Charging Framework (PCF) defined by the LTE standard that allows for specifying parameters to define the priority and pre-emption capability of a dedicated bearer. Specifically, Allocation Retention Priority (ARP) is a key parameter that is applied during congestion situations for preemption. ARP is stored in the subscriber profile (HSS), typically on a per APN basis, and is not included within the EPS QoS profile sent to the handset 134.

ARP has following three sub-parameters:

Preemption Priority: defines priority levels between 1 and 15.

Preemption capability: determines whether a bearer with a lower ARP priority level should be dropped to free up the required resources.

Preemption vulnerability: determines whether a bearer is applicable for dropping by a pre-emption-capable bearer with a higher ARP priority value.

5.3 Call Flows

Figure 6:
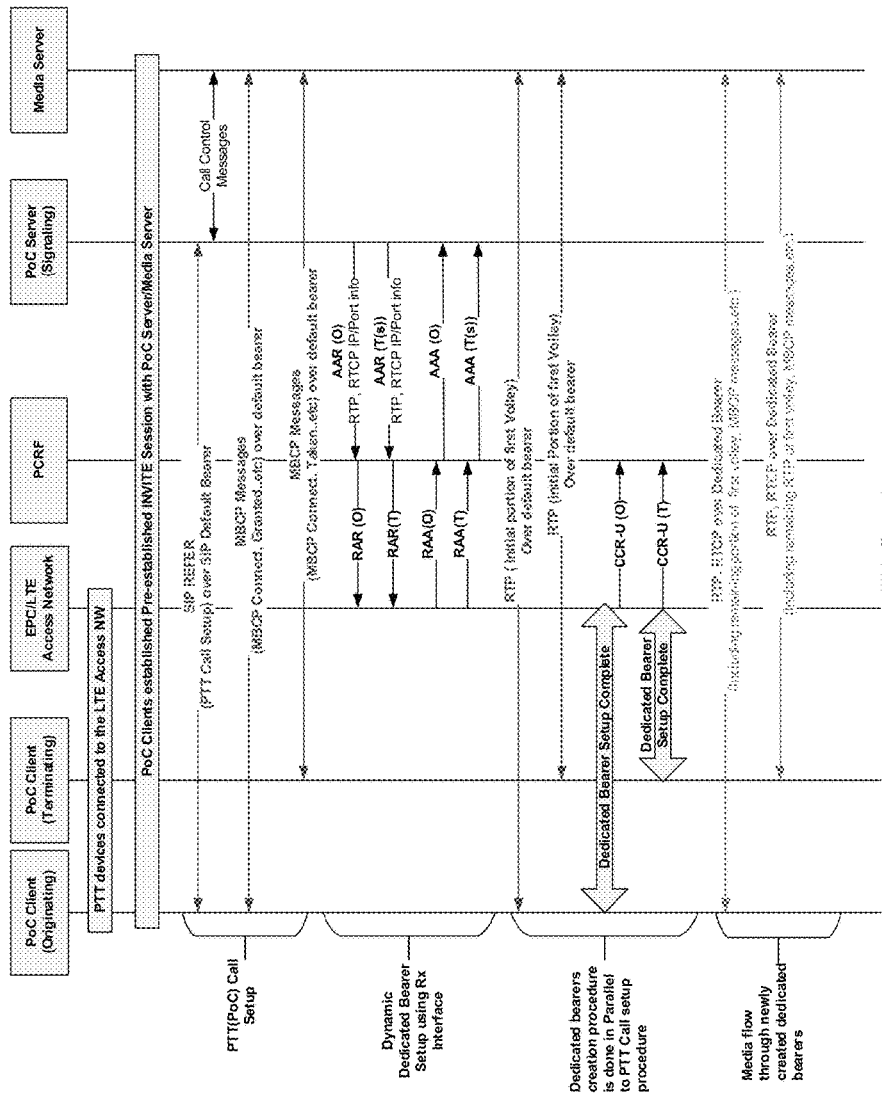
FIG. 6 is a call flow diagram illustrating a PTT call setup with the establishment of dynamic bearer paths, according to one embodiment of the present invention.

5.3.1 Call Flow—PTT Call Setup with the Establishment of Dynamic Dedicated QoS Bearers FIG. 6 is a call flow diagram illustrating the PTT call setup with the establishment of dynamic dedicated QoS bearers.

1. The PoC Server 112 first attempts to establish the PTT call regardless of whether the dynamic QoS feature is enabled or not.

2. At the time of PTT call initiation, the PoC Server 112 validates the following on the calling and each called party's call leg before sending a request to setup a dynamic dedicated QoS bearer for that call leg:
   a. The subscriber has subscribed for a dynamic QoS during PTT calls.
   b. A P-Access-Network-Info (PANI) value in the MBCP Connect Ack message indicates that the subscriber is currently on an LTE access network 126.

3. If the configuration is enabled to upgrade all call legs to dynamic QoS, regardless of subscription, and at least one participant has dynamic QoS subscribed, then for each of the participants including calling and called parties that have not subscribed for dynamic QoS, the PoC Server 112 validates the following before sending a request to setup the dynamic dedicated QoS bearer for that call leg:
   a. The PANI value in the MBCP Connect Ack message indicates that the subscriber is currently on the network 126.

4. For each of the call legs, if the corresponding subscriber is not currently on the network 126, then the dynamic dedicated QoS bearer shall not be setup for that subscriber regardless of their feature subscription.

5. After the dynamic dedicated QoS bearer has been setup for a call leg due to their feature subscription or due to upgrading all of the call legs within a PTT call, each call leg's dynamic dedicated QoS bearer shall be handled independently of other participants in the PTT call.

a. Note the following: Consider the scenario where calling party A has a subscription for dynamic QoS, but called parties B, C and D do not have the feature subscription. Due to the configuration being enabled to upgrade all call legs in a PTT call, B, C and D also get a dynamic dedicated QoS bearer setup for this call. When A disconnects from the PTT call, B, C and D continue with the dynamic dedicated QoS bearer until they all disconnect from the PTT call or move out of the coverage area for the network 126. When they return back to the coverage area of the network 126, the dynamic dedicated QoS bearer should be setup again for each of these call legs. This continues until the call ends.

6. The PoC Server 112 stores information that the call itself is upgraded to a dynamic dedicated QoS bearer for all call legs at the time of call initiation and applies this information for all call legs in this call for the duration of the call.

a. This information shall be applied even when the call legs join or rejoin the call, or move in and out of the coverage area of the network 126.

Figure 7:
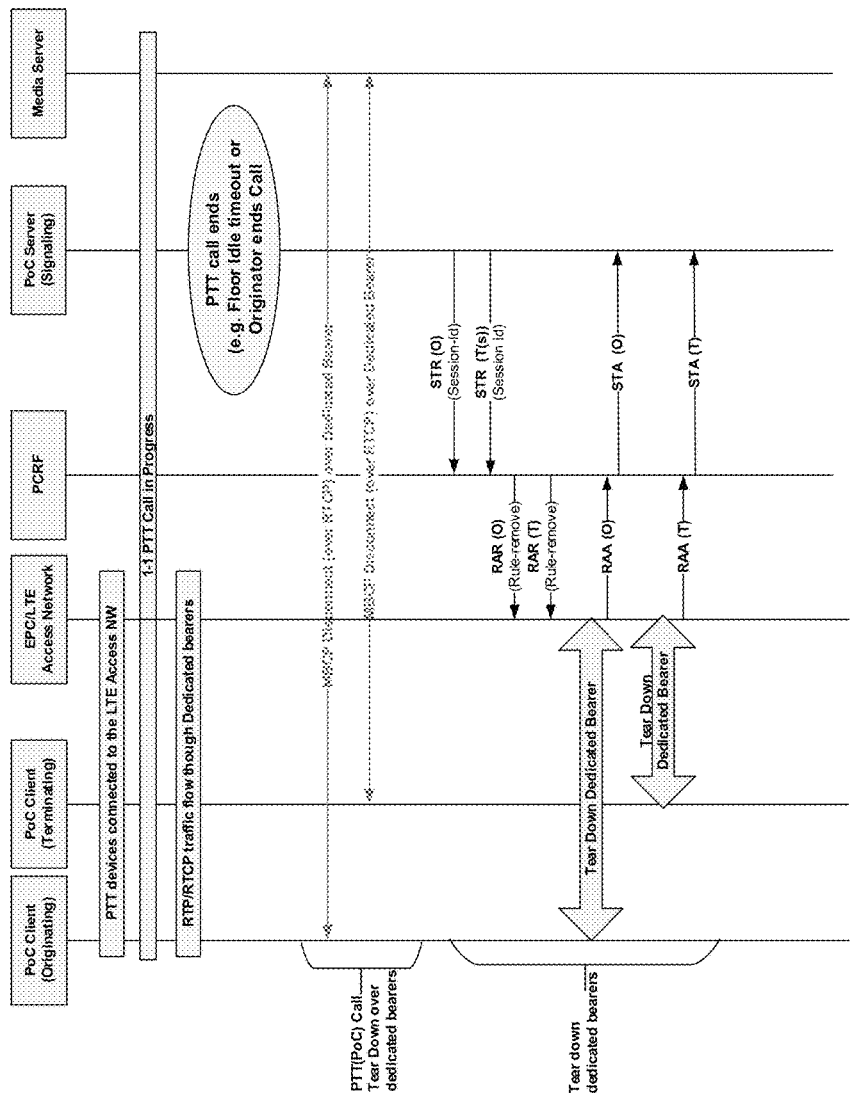
FIG. 7 is a call flow diagram illustrating a PTT call end with the teardown of dynamic bearer paths, according to one embodiment of the present invention.

5.3.2 Call Flow—PTT Call Ends with the Teardown of Dynamic Dedicated QoS Bearers FIG. 7 is a call flow diagram illustrating the PTT call end with the teardown of dynamic dedicated QoS bearers.

1. When a call leg disconnects from a PTT call and a dynamic dedicated QoS bearer has been setup for that call leg, then the PoC Server 112 sends an Rx interface request to release the dynamic dedicated QoS bearer for that call leg.

2. When a PTT call ends, either due to only one participant remaining on the call or the floor idle timer expiring, then the PoC Server 112 releases the dynamic dedicated QoS bearer for each call leg, if it has been setup for that call leg for the PTT call.

Figure 8:
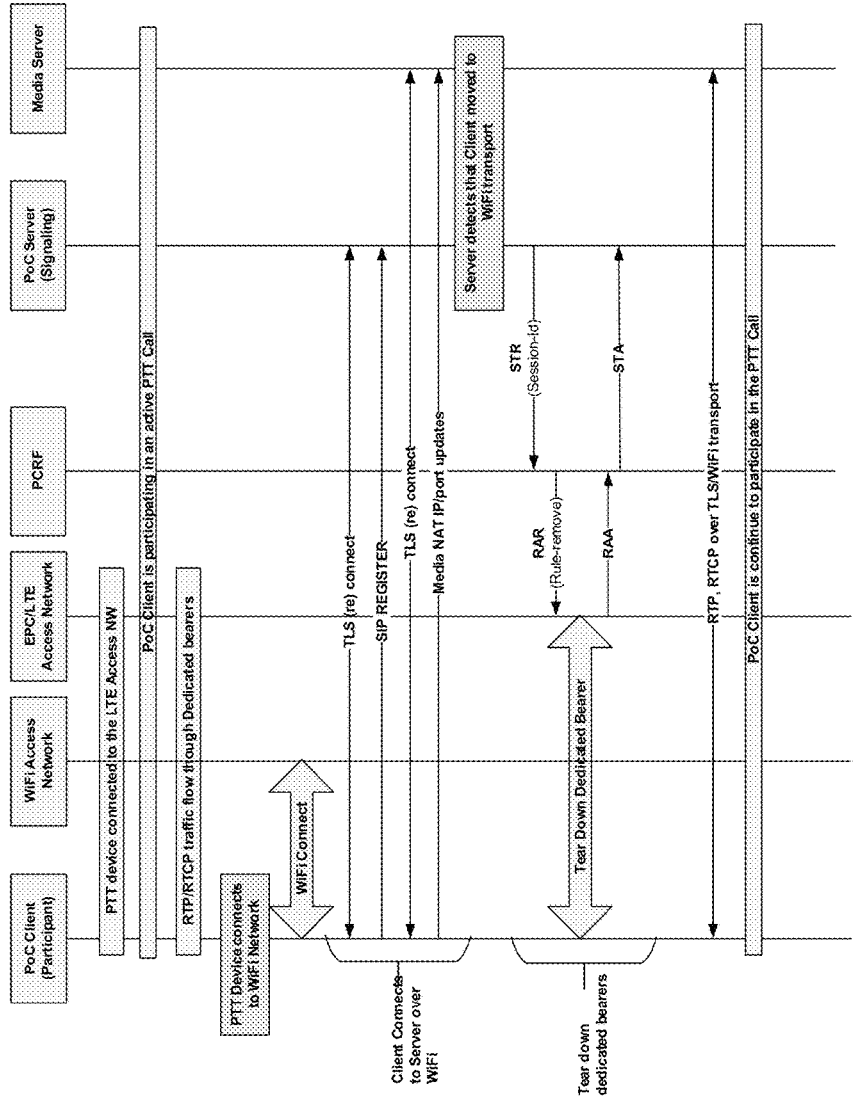
FIG. 8 is a call flow diagram illustrating a PTT call transitioning to WiFi with the teardown of dynamic bearer paths, according to one embodiment of the present invention.

5.3.3 Call Flow—WiFi Transition with Teardown of Dedicated Dynamic Dedicated QoS Bearers FIG. 8 is a call flow diagram illustrating the PTT call transitioning to WiFi with the teardown of dynamic dedicated QoS bearers.

1. When a subscriber moves out of the coverage area of the network 126:
   a. The PoC Client 136 is expected to receive "network down" and "network up" events.
   b. The PoC Client 136 sends a refresh-REGISTER request.
   c. The PoC Server 112 checks if the subscriber is in a PTT call and has a dynamic dedicated QoS bearer setup.
   d. If subscriber is in a PTT call and a dynamic dedicated QoS bearer is setup, then:
      i. If the subscriber has moved into a WiFi network 144, then the PoC Server 112 sends an Rx interface request to the PCRF Server 150 immediately to release the dynamic dedicated QoS bearer for that call leg.
      ii. If subscriber has moved into a different non-LTE network, or when the PANI value is invalid and does not indicate a WiFi network 144, then
         I. The PoC Server 112 starts a timer for the value defined in "QoS bearer teardown wait timer".
         II. If the PoC Server 112 receives a "release of bearer" indication from the PCRF Server 150, then the PoC Server 112 stops the timer and cleans up the call leg's dynamic dedicated QoS bearer related states.
         III. If the timer expires, then the PoC Server 112 sends an Rx interface request to the PCRF Server 150 to release the dynamic dedicated QoS bearer for that call leg.

2. When a subscriber moves into the coverage area of the network 126:
   a. The PoC Client 136 is expected to receive "network down" and "network up" events.
   b. The PoC Client 136 sends a refresh-REGISTER request.
   c. The PoC Server 112 checks if the subscriber is in a PTT call.
   d. If subscriber is in a PTT call and, if the call state indicates a dynamic dedicated QoS bearer for all call legs, or if the subscriber has dynamic QoS feature enabled, then the PoC Server 112 sends an Rx interface request to the PCRF Server 150 to setup a dynamic dedicated QoS bearer for that call leg.

5.3.4 Detailed Summary of Various Use Cases on WiFi and LTE Transitions

The following table provides a detailed summary of the various use cases on transitions between the WiFi network 144 and the EPC/LTE access network 126:

| # | Transition Case | Expected Behavior |
|---|---|---|
| 1 | LTE->WiFi (regular Internet offload):<br>Pre-condition: The handset 134 is connected to the network 126 and is participating in an active PTT call.<br>Transition: The handset 134 attaches to the WiFi network 144 and offloads all Internet traffic to the WiFi network 144. | 1. The PoC Client 136 reconnects to the PoC Server 112 over the WiFi network 144, and reports the transport change event to the PoC Server 112.<br>2. The PoC Server 112 recognizes the WiFi network 144 transition of the PoC Client 136, and tears down the dynamic dedicated QoS bearer for the transitioned PoC Client 136 that was established while the handset was on the network 126.<br>3. The PoC Client 136 continues to participate in the PTT call.<br>Note that the availability of the network 126 after the WiFi network 144 transition is irrelevant, as the PoC Client 136 transitions to the WiFi network 144 regardless. |

-continued

| # | Transition Case | Expected Behavior |
|---|---|---|
| 2 | LTE->WiFi (IMS APN Offload):<br>Pre-condition: The handset 134 is connected to the network 126 and participating in an active PTT call.<br>Transition: The handset 134 attaches to the WiFi network 144, offloads all Internet traffic to the WiFi network 144 and also offloads the IMS Access Point Name (APN) to the WiFi network 144. | The transition is handled the same as in Case#1 above, i.e., LTE-> WiFi (regular Internet offload).<br>Even if the IMS APN is offloaded to the WiFi network 144, the PoC Client 136 utilizes a regular WiFi network 144 offload mechanism as described in case #1 above. |
| 2 | WiFi ->LTE:<br>Pre-condition: The handset 134 is connected to the WiFi network 144 and is participating in an active PTT call.<br>Transition: The handset 134 loses the connection to the WiFi network 144 and transitions to the network 126 during an active PTT call. | 1. The PoC Client 136 reconnects to the PoC Server 112 through the network 126 and reports transport change events to the PoC Server 112.<br>2. The PoC Server 112 recognizes the transition by the PoC Client 136 to the network 126, and hence establishes a dynamic dedicated QoS bearer for the transitioned PoC Client 136.<br>3. Media packets flow through the default bearer until the dynamic dedicated QoS bearer is setup (similar to the call setup flow).<br>4. The PoC Client 136 continues to be active in the PoC call.<br>Note that the PoC Client 136 connects to the PoC Server 112 directly over the WiFi network 144. |
| 4 | WiFi only:<br>Pre-condition: The handset 134 is connected to the WiFi network 144<br>Action:<br>The handset 134 participates in an active PTT call. | 1. The PoC Client 136 communicates with the PoC Server 112 using the WiFi network 144.<br>2. Call participation as normal.<br>3. Based on transport information provided by the PoC Client 136 previously, the PoC Server 112 does not attempt to establish a dynamic dedicated QoS bearer when the PoC Client 136 is using the WiFi network 144.<br>Note that the PoC Client 136 interacts with the PoC Server 112 directly over the WiFi network 144. |

5.3.5 Detailed Summary of Various Use Cases on LTE and Non-LTE Transitions

The following table provides a detailed summary of the various use cases on LTE network 126 and non-LTE network transitions, for example, using different Radio Access Technology (RAT), such as eHRPD, 3G/UMTS, HSPA, etc.

| # | Transition Case | Expected Behavior | Comments |
|---|---|---|---|
| 1 | LTE-> Non-LTE RAT:<br>Pre-condition: The handset 134 is connected to the network 126 and participating in an active PTT call.<br>Transition: The handset 134 transitions to a non-LTE RAT. | 1. The PoC Client 136 detects transition and reports the RAT type change to the PoC Server 112.<br>2. Based on the report from the PoC Client 136, the PoC Server 112 tears down the dynamic dedicated QoS bearer for the transitioned PoC Client 136 using the Rx interface.<br>Note that the PTT call most likely gets terminated because of the possible longer transition time/data session re-establishment. | The capability of the PoC Client 136 to detect and report the non-LTE RAT transition is being evaluated. |
| 2 | Non-LTE RAT->LTE:<br>Pre-condition: The handset 134 is connected to a non-LTE RAT and participating in an active PTT call.<br>Transition: The handset 134 transition from the non-LTE RAT to the network 126. | 1. The PoC Client 136 reconnects to the PoC Server 112 through the network 126.<br>2. The PoC Server 112 recognizes the transition of the PoC Client 136 to the network 126 based on a report from the PoC Client 136, and hence establishes a dynamic dedicated QoS bearer for the transitioned PoC Client 136. | The PoC Client 136 has the capability to detect and report the non-LTE RAT to LTE transition is being evaluated. |

-continued

| # | Transition Case | Expected Behavior | Comments |
|---|---|---|---|
| | | 3. Media packets flow through default bearer until the dynamic dedicated QoS bearer is setup (similar to a call setup flow).<br>4. The PoC Client 136 continues to be active in the PTT call. | |
| 2 | Non-LTE RAT only:<br>Pre-condition: The handset 134 is connected to a non-LTE RAT.<br>Action:<br>The PoC Client 136 participates in an active PTT call. | 1. Call participation as normal.<br>2. The PoC Server 112 does not attempt to establish a dynamic dedicated QoS bearer, based on the knowledge that the PoC Client 136 is using a non-LTE RAT. | This is based on assumption that the PoC Client 136 can report the non-LTE RAT type to the PoC Server 112 during login or the transition. |

5.3.6 Detailed Summary of Dedicated Bearers

The following table provides a detailed summary of the dedicated bearers at the time of call setup and during the call.

| Dedicated Bearer at Time of Call Setup | | Dedicated Bearer Handling During Call | | | |
|---|---|---|---|---|---|
| RAT Type at Call Setup Time | PoC Server Action | RAT Type After Transition | PoC Server Action | PCRF Notification to PoC Server | Comments |
| LTE | Establish Bearer | LTE | None | None | |
| | | Non-LTE RAT | Tear Down Bearer | Yes | Tear Down Trigger - PCRF notification or transition event report from client; whichever comes to server first |
| | | WiFi | Tear Down Bearer | No | Tear down Trigger - Transition event Report from the PoC Client 136. |
| Non-LTE RAT | No bearer established | Non-LTE RAT or WiFi | None | None | |
| | | LTE | Establish Bearer | None | Establish Trigger - Transition event Report from the PoC Client 136. |
| WiFi (with or without IMS) | No bearer Established | Non-LTE RAT or WiFi | None | None | |
| | | LTE | Establish Bearer | None | Establish Trigger - Transition event Report from the PoC Client 136. |

6 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   initiating, by a push-to-talk (PTT) server, a PTT call session with a PTT client by exchanging control messages over a first bearer having first quality-of-service (QoS) parameters;
   establishing, by the PTT server, a second bearer having second QoS parameters different from the first QoS parameters, wherein the establishing the second bearer is performed during at least a portion of the initiating the PTT call session;
   exchanging, by the PTT server, media messages with the PTT client over the first bearer before the second bearer is established; and
   exchanging, by the PTT server, the media messages with the PTT client over the second bearer in response to completion of the establishing the second bearer.

2. The method of claim 1, wherein the establishing the second bearer comprises:
establishing, by the PTT server, the second bearer in response to the PTT server initiating the PTT call session.

3. The method of claim 1, wherein the establishing the second bearer comprises:
establishing, by the PTT server, the second bearer in response to receiving a login request from the PTT client.

4. The method of claim 1, further comprising:
upgrading, by the PTT server, the second bearer in response to the PTT server initiating the PTT call session.

5. The method of claim 1, further comprising:
upgrading, by the PTT server, the second bearer in preparation of the PTT call session being initiated.

6. The method of claim 1, wherein the first bearer is a static bearer in a cellular network, the first bearer established in response to the PTT client attaching to the cellular network.

7. The method of claim 1, further comprising:
tearing down, by the PTT server, the second bearer.

8. The method of claim 7, wherein the second bearer is torn down in response to the PTT client dropping the PTT call session.

9. The method of claim 7, wherein the second bearer is torn down in response to the PTT call session timing out.

10. The method of claim 7, wherein the second bearer is established in response to the PTT client accessing the PTT server over a long term evolution (LTE) network, and wherein the second bearer is torn down in response to the PTT client transitioning from the LTE network to a Wi-Fi network.

11. The method of claim 10, wherein the second bearer is established in further response to receiving, by the PTT server, an indication from the PTT client that the PIT client is connected to a radio access network (RAN) that is part of the LTE network.

12. The method of claim 1, wherein the second bearer is established in response to the PTT client transitioning from a Wi-Fi network to a long term evolution (LTE) network while accessing the PTT server.

13. The method of claim 1, wherein the establishing the second bearer comprises:
transferring, by the PTT server, the second QoS parameters for the second bearer to a policy charging and rules function (PCRF) over a Rx interface.

14. The method of claim 13, wherein transferring the second QoS parameters for the second bearer comprises:
determining, by the PTT server, the second QoS parameters based on a user role of the PTT client, a call type of the PTT call session, or combination thereof.

15. The method of claim 1, wherein the second bearer is established in response to determining the PTT client is a member of a predefined role.

16. The method of claim 1, wherein the media messages are realtime transport protocol (RTP) messages, and wherein the control messages are session initiation protocol (SIP) messages or realtime transport control protocol (RTCP) messages.

17. A push-to-talk (PTT) server comprising:
a processor; and
a computer readable storage medium storing programming for execution by the processor, the programming including instructions for:
initiating a PTT call session with a PTT client by exchanging control messages over a first bearer having first quality-of-service (QoS) parameters;
establishing a second bearer having second QoS parameters different from the first QoS parameters, wherein the establishing the second bearer is performed during at least a portion of the initiating the PTT call session;
exchanging media messages with the PTT client over the first bearer before the second bearer is established; and
exchanging the media messages with the PTT client over the second bearer in response to completion of the establishing the second bearer.

18. The PTT server of claim 17, wherein the instructions for establishing the second bearer comprise instructions for:
establishing the second bearer in response to the PTT server initiating the PTT call session.

19. The PTT server of claim 17, wherein the instructions for establishing the second bearer comprise instructions for:
establishing the second bearer in response to receiving a login request from the PTT client.

20. The PTT server of claim 17, wherein the instructions further comprise instructions for:
upgrading the second bearer in response to the PTT server initiating the PTT call session.

21. The PTT server of claim 17, wherein the instructions further comprise instructions for:
upgrading the second bearer in preparation of the PTT call session being initiated.

22. The PTT server of claim 17, further comprising instructions for:
tearing down the second bearer.

23. The PTT server of claim 22, wherein the second bearer is torn down in response to the PTT client dropping the PTT call session.

24. The PTT server of claim 22, wherein the second bearer is torn down in response to the PTT call session timing out.

25. The PTT server of claim 22, wherein the second bearer is established in response to the PTT client accessing the PTT server over a long term evolution (LTE) network, and wherein the second bearer is torn down in response to the PTT client transitioning from the LTE network to a Wi-Fi network.

26. The PTT server of claim 25, wherein the second bearer is established in further response to receiving, by the PTT server, an indication from the PTT client that the PTT client is connected to a radio access network (RAN) that is part of the LTE network.

27. The PTT server of claim 17, wherein the second bearer is established in response to the PTT client transitioning from a Wi-Fi network to a long term evolution (LTE) network while accessing the PTT server.

* * * * *